United States Patent
Mansour et al.

(10) Patent No.: US 12,513,562 B2
(45) Date of Patent: Dec. 30, 2025

(54) ARTIFICIAL INTELLIGENCE BASED ADMISSION CONTROL IN MULTI-VENDOR O-RAN

(71) Applicant: Dell Products L.P., Round Rock, TX (US)

(72) Inventors: Marwan Mansour, Alexandria (EG); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 815 days.

(21) Appl. No.: 17/811,415

(22) Filed: Jul. 8, 2022

(65) Prior Publication Data
US 2024/0015566 A1    Jan. 11, 2024

(51) Int. Cl.
*H04W 28/02*    (2009.01)
*H04W 48/02*    (2009.01)

(52) U.S. Cl.
CPC ....... *H04W 28/0268* (2013.01); *H04W 48/02* (2013.01)

(58) Field of Classification Search
CPC . H04W 28/0268; H04W 28/24; H04W 28/16; H04W 48/02; H04W 48/06; H04W 12/08; H04W 12/12; H04W 72/00; H04K 3/00
See application file for complete search history.

(56) References Cited

U.S. PATENT DOCUMENTS

2022/0046652 A1* 2/2022 Yang .................. H04L 47/24
2024/0414050 A1* 12/2024 Sorrentino .......... H04L 41/5025

OTHER PUBLICATIONS

Challa, et al. "Network Slice Admission Model: Tradeoff Between Monetization and Rejections," Published in: IEEE Systems Journal (vol. 14, Issue: 1, Mar. 2020), Date of Publication: Apr. 1, 2019, DOI: 10.1109/JSYST.2019.2904667, pp. 657-660.

Manosha, et al. "Admission Control Algorithms for QoS-Constrained Multicell MISO Downlink Systems," Published in:IEEE Transactions on Wireless Communications (vol. 17, Issue: 3, Mar. 2018), Date of Publication: Dec. 29, 2017, DOI: 10.1109/TWC.2017.2787641, pp. 1982-1999.

Caballero, et al. "Network Slicing for Guaranteed Rate Services: Admission Control and Resource Allocation Games," Published in: IEEE Transactions on Wireless Communications (vol. 17, Issue: 10, Oct. 2018), Date of Publication: Aug. 2, 2018, DOI: 10.1109/TWC.2018.2859918, pp. 6419-6432.

* cited by examiner

*Primary Examiner* — Brian T Le
(74) *Attorney, Agent, or Firm* — Amin, Turocy & Watson, LLP

(57) ABSTRACT

Technology described herein can employ dynamically changing network variables and/or user entity priorities to determine admission of one or more user entities to the network. In an embodiment, a system can comprise a processor, and a memory that stores executable instructions that, when executed by the processor, facilitate performance of operations. The operations can comprise analyzing resource allocation for a quality of service flow. The operations further can comprise, based on a result of the analyzing the resource allocation, determining a threshold for quality of service for user equipment at the quality of service flow, and determining a connection decision for a user equipment based on a comparison of a quality of service prediction of a quality of service level for the user equipment to the threshold.

20 Claims, 14 Drawing Sheets

1100 ⬅

```
┌─────────────────────────────────────────────────────────────────┐
│ Analyzing, by a system comprising a processor, resource          │
│ allocation for a quality of service (QoS) flow. 1102             │
└─────────────────────────────────────────────────────────────────┘
                                │
                                ▼
┌─────────────────────────────────────────────────────────────────┐
│ Wherein the analyzing the resource allocation comprises          │
│ analyzing, by the system, network output to facilitate           │
│ determining occurrence of one or more unanticipated              │
│ degrading levels of QoS. 1103                                    │
└─────────────────────────────────────────────────────────────────┘
                                │
                                ▼
┌─────────────────────────────────────────────────────────────────┐
│ Determining, by the system, and based on a result of the         │
│ analyzing the resource allocation, a threshold for QoS for       │
│ user equipment (UE) at the QoS. 1104                             │
└─────────────────────────────────────────────────────────────────┘
                                │
                                ▼
┌─────────────────────────────────────────────────────────────────┐
│ Outputting, by the system, based on current data and historical  │
│ learned data for a network communicatively coupled to or         │
│ comprising the system, the QoS prediction for the UE and one     │
│ or more additional QoS predictions for additional UE, other      │
│ than the UE, already connected to the network. 1106              │
└─────────────────────────────────────────────────────────────────┘
                                │
                                ▼
┌─────────────────────────────────────────────────────────────────┐
│ Determining, by the system a connection decision for a UE        │
│ based on a comparison of a QoS prediction of a QoS level for     │
│ the UE to the threshold. 1108                                    │
└─────────────────────────────────────────────────────────────────┘
                                │
                                ▼
┌─────────────────────────────────────────────────────────────────┐
│ Determining, by the system, the connection decision at least     │
│ partially based on a determination of priority of the UE as      │
│ compared to one or more priorities of one or more additional     │
│ UE, other than the UE, already connected to a network            │
│ communicatively coupled to or comprising the system. 1110        │
└─────────────────────────────────────────────────────────────────┘
                                │
                                ▼
                              1212
```

Triggering, by the system, the determination of priority based on a predicted violation of the threshold by the UE or by another UE already connected via the network. 1212

Admitting, by the system, the UE to the network based on a higher priority of the UE as compared to at least one priority of at least one of the additional UE already connected to the network. 1214

Alternatively or additionally to 1214, enabling degradation of at least one QoS of at least one of the additional UE already connected to the network, based on at least one lower priority of that at least one of the additional UE as compared to a priority of the UE. 1216

Allocating, by the system, resources of a network communicatively coupled to or comprising the system, the allocating comprising determining the resource allocation for the QoS flow based on a defined slicing process. 1218

Employing, by the system, one or more artificial intelligence models to predict the QoS level, to determine the threshold, and/or to conduct the resource allocation analysis. 1220

Training, by the system, the one or more artificial intelligence models upon determination of an occurrence of an unintended degrading level of service for the user equipment or for the another user equipment. 1222

FIG. 12

ARTIFICIAL INTELLIGENCE BASED ADMISSION CONTROL IN MULTI-VENDOR O-RAN

BACKGROUND

Modern cellular systems continue to advance, where various components of a respective network can be managed and/or otherwise controlled by multiple vendors. In this way, standards and/or default configurations for various processes can be different or non-specified for different vendors. This can result in varying qualities of service for different user entities of a network, or for different vendors on the network. Static solutions to these such processes can be faulty, result in error, or result inconsistencies relative to user-expected service or even base functionality. Differently, the processes themselves, and/or the variables for the processes, can change dynamically, such as due to vendor upgrades, compatibilities and/or the like. Therefore, it can be desired to determine solutions to such processes, which solutions can adapt dynamically with changes to the processes.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for determining access of a user entity to a network having components have different vendor managers and/or controllers. The system can employ solutions to access requests based on learned data for a network, which solutions can be dynamically depending on present network criteria and/or different for different user entities having access or not already having access to the network.

An example system can comprise a processor, and a memory that stores executable instructions that, when executed by the processor, facilitate performance of operations. The operations can comprise analyzing resource allocation for a quality of service flow. The operations further can comprise, based on a result of the analyzing the resource allocation, determining a threshold for quality of service for user equipment at the quality of service flow, and determining a connection decision for a user equipment based on a comparison of a quality of service prediction of a quality of service level for the user equipment to the threshold.

An example method can comprise predicting, by a system comprising a processor, a quality of service level for a user equipment requesting admission to a network, and determining, by the system, a connection decision for the user equipment based on a comparison of the quality of service level for the user equipment to a threshold determined based on a current prediction for resource allocation of the network.

A non-transitory machine-readable medium, comprising executable instructions that, when executed by a processor facilitate performance of operations, comprising obtaining a request for admittance by a first user equipment to a network, determining a threshold for quality of service for second user equipment connected to or to be connected to the network, based on learned network parameters, and generating a decision for response to the request based on the threshold.

An advantage of the one or more embodiments of the aforementioned system, method and/or non-transitory machine-readable medium can be allowing for dynamic control of admission control such as when a network comprises multi-vendors and/or components of multi-vendors.

In one or more embodiments of the aforementioned system, method and/or non-transitory machine-readable medium the user equipment can be requesting admission to a network communicatively coupled to or comprising the system, or another user equipment can be requesting admission to the network and the user equipment is already admitted to the network communicatively coupled to or comprising the system.

In one or more embodiments of the aforementioned system, method and/or non-transitory machine-readable medium based on current and historical learned data for a network communicatively coupled to or comprising the system, outputting the quality of service prediction for the user equipment and one or more additional quality of service predictions for additional user equipment, other than the user equipment, already connected to the network.

An advantage of these one or more processes can be a learned and dynamic approach to admission control, absent use of static and fixed thresholds, thus accounting for dynamic conditions of a network and/or dynamic changes to user entity permissions, priorities and/or the like.

In one or more embodiments of the aforementioned system, method and/or non-transitory machine-readable medium admitting the user equipment to the network based on a higher priority of the user equipment as compared to at least one priority of at least one of the additional user equipment already connected to the network, or enabling degradation of at least one quality of service of at least one of the additional user equipment already connected to the network, based on at least one lower priority of the at least one of the additional user equipment as compared to a priority of the user equipment.

An advantage of these one or more processes can be dynamic control that is adapted to different permissions, priorities and/or the like of different user entities.

BRIEF DESCRIPTION OF THE DRAWINGS

The technology described herein is illustrated by way of example and not limited in the accompanying figures, in which like reference numerals indicate similar elements.

FIG. 11 illustrates a process flow diagram of a method of admission control by the network admission control system of FIG. 3, in accordance with one or more embodiments and/or implementations described herein.

FIG. 12 illustrates a continuation of the process flow diagram of FIG. 11 of a method of admission control by the network admission control system of FIG. 3, in accordance with one or more embodiments and/or implementations described herein.

DETAILED DESCRIPTION

Overview

Figure 1:
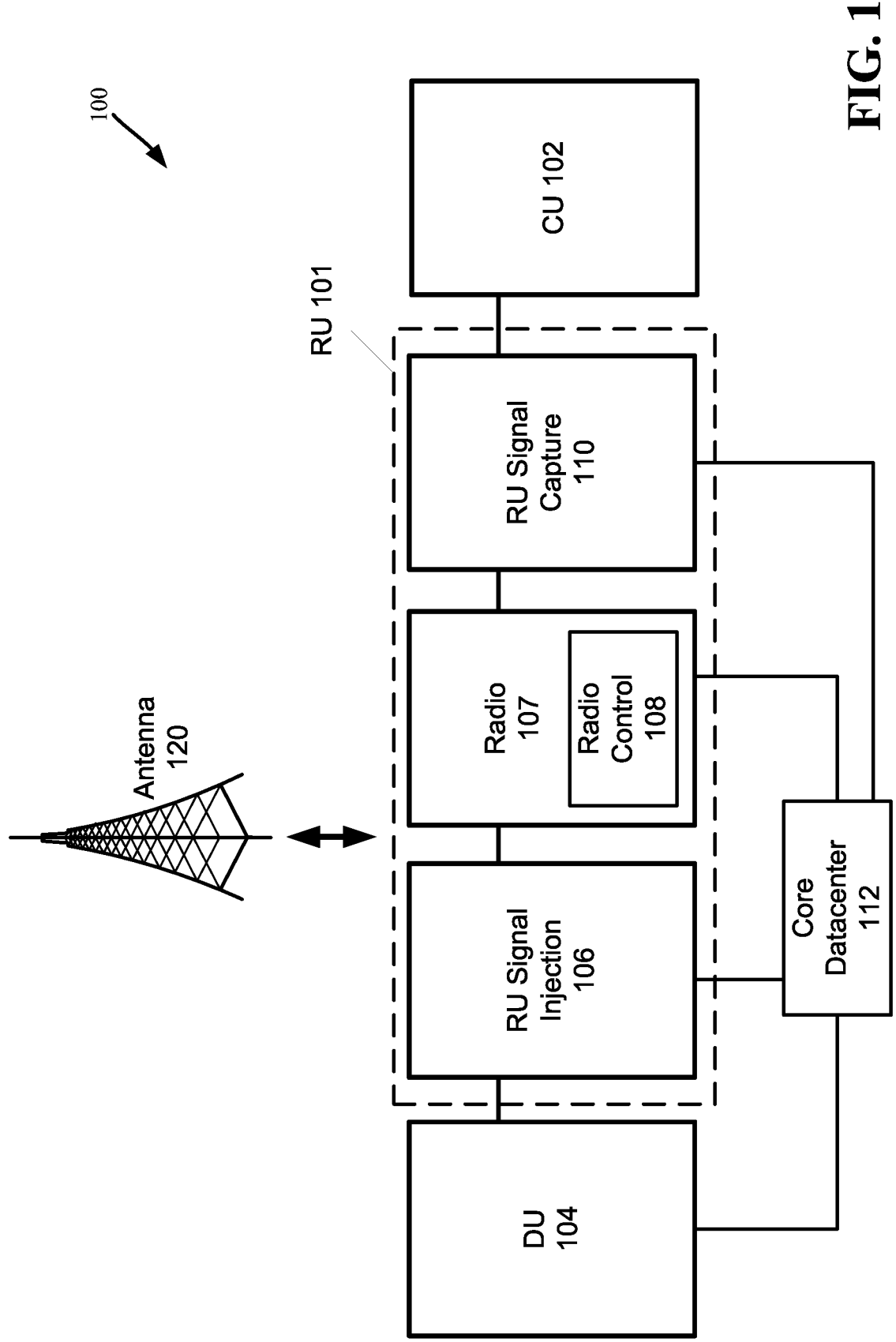
FIG. 1 illustrates a schematic representation of example elements of a radio system/network, in accordance with one or more embodiments and/or implementations described herein.

The technology described herein is generally directed towards a process to provide admission control to a network, which admission control can be dynamic relative to network conditions and/or variables, and/or which network control can be dynamic relative to different user entities on and/or not yet on the network. Admission control refers to deciding whether a certain user equipment (UE) shall be connected to the network or not. The decision is conventionally taken using a predefined criteria such as load (e.g., number of users or physical resource block (PRB) utilization level). PRBs can be employed for transmission and/or reception, for example.

Conventional approaches assume static spectrum allocation, and fixed relation between load and security level agreement (SLA) on the one hand, and admission control thresholds on the other hand. This can be problematic and often does not hold true in cases of multi-vendor deployment with dynamic slicing and aperiodic traffic with heterogenous quality of service (QoS) satisfaction levels. An SLA dan define availability, reliability and/or performance requirements of a system.

To account for one or more of these deficiencies, one or more systems, methods and/or non-transitory computer readable mediums are defined herein that can employ artificial intelligence learning-based admission control to capture semi-observable time-varying bandwidth, reconfigurable priority of QoS flows, and/or channel conditions due to network planning. These embodiments, alternatively and/or additionally, can employ user entity-based priority and/or other vendor-defined factor and/or threshold to manage the admission control to the network.

Indeed, a problem with conventional admission control can be defined as maximizing a number of admitted user in a network to maximize resource utilization, while still satisfying one or more trade-off requirements including ability of the network to satisfy specified QoS for each user entity.

In connection therewith, there can be a desire to measure radio performance, and/or to generate and/or store data in one or more ways that allow for comparative analysis of such data (including metadata) that is collected from different sources, at different time points, and/or relative to one or more other dynamic and/or changing variables. Accordingly, one or more aspects described herein can collect, synchronize and/or analyze data, such as loading conditions relative to different user entity admissions, user entity priority data, and/or the like for a network for which admission is being controlled.

The data collected and/or the results of analysis of the data can allow for real-time, immediate, short-term and/or long-term admission control decisions and/or even improvements, troubleshooting and/or predictive modeling regarding radio system performance, failures, issues, continuity and/or other aspects related to various admissions, or denials thereof, to the network. For example, the resulting data, can be employed for planning of network capacity, and/or identifying new service availabilities, relative to the radio system.

In one example, relationships between number of users and their specified QoS satisfaction levels can be employed, along with underlying scheduling and/or slicing controls to distribute resources among different flows, such as relative to different vendors. In one or more embodiments defined herein, network functions such as DU and CU of same or neighboring gNBs that are designed by different vendors and/or adopt various traffic steering and admission controls can be handled to find optimal configuration and admission control criteria that can work for different deployment realizations and/or QoS flow prioritizations.

Generally, one or more embodiments described herein are directed to a framework that can assume a non-static spectrum allocation, non-fixed relation between load and SLA, and other dynamically-changing network conditions for admission control to the network. Using the one or more embodiments described herein, such data can not only be collected and measured, but also recorded, stored, recalled, and/or used, such as automatically and/or employing artificial intelligence, machine learning, deep learning and/or the like to proactively and/or reactively address the admission control of user entities at a network relative to any one or more of performance, system operation, and/or customer experience.

To provide these one or more operations and/or features, reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power, thermal power, size, weight and/or the like.

As used herein, the term "resource" can refer to power, money, memory, processing power and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio system architecture is illustrated at 100. The radio system 100 can comprise a central unit (CU) 102, distributed unit (DU) 104 (also herein referred to as a DU portion 104) and a radio unit (RU) 101. The CU 102 can comprise protocol layers and can be responsible for various protocol stack functions. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. In one or more embodiments, the RU signal capture portion 110 can analyze data captured. The DU portion 104 and RU portion 106 can provide data to, and receive data from, the core datacenter 112.

Figure 2:
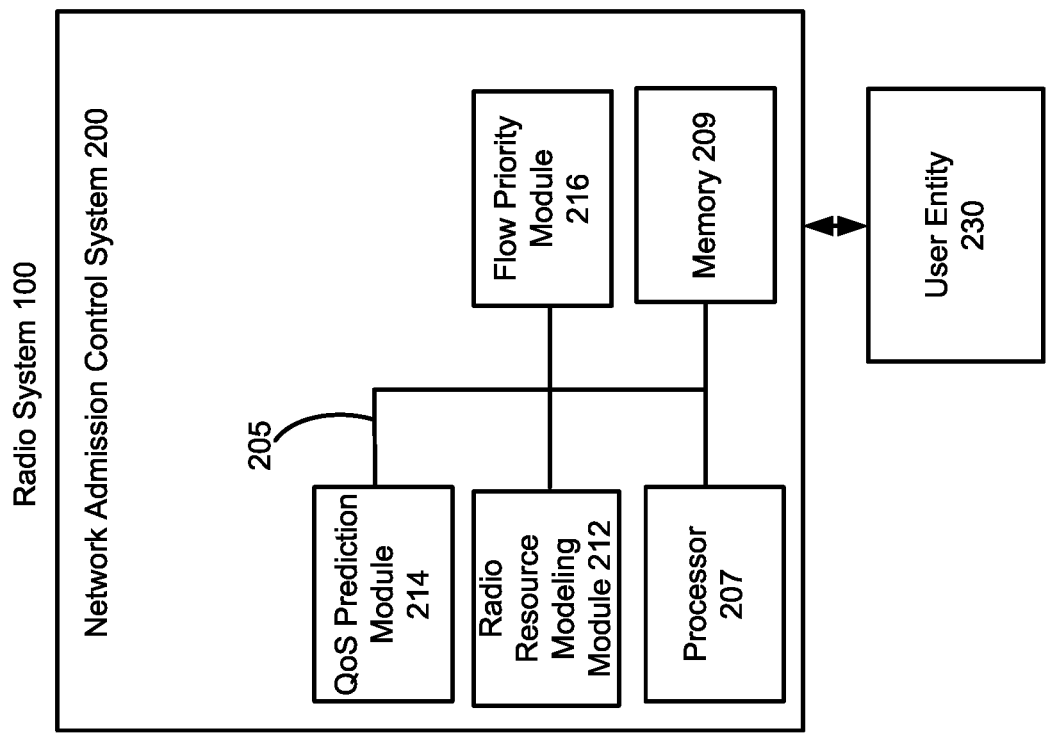
FIG. 2 illustrates another schematic representation of the radio system of FIG. 1, comprising a network admission control system, in accordance with one or more embodiments and/or implementations described herein.

Turning next to FIG. 2, an example of a radio system architecture is illustrated at 100, with description being provided below. The network admission control system 300 can be part of the radio system 100 (e.g., of FIG. 1) or can be at least partially external to the radio system 100. For purposes of brevity, additional aspects of the radio system 100 (e.g., as illustrated at FIG. 1) are not illustrated at FIG. 2. While referring here to one or more processes, operations, facilitations and/or uses of the non-limiting system architecture 200, description provided herein, both above and below, also can be relevant to one or more other non-limiting system architectures described herein.

The network admission control system 200 can generally enable and/or reject a request for admission to a network by a user entity 230. As illustrated, the network admission control system 200 can comprise a processor 206, memory 204, bus 205, radio resource modeling module 212, QoS prediction module 214 and/or flow priority module 216. Generally, the radio resource modeling module 212 can analyze resource allocation for a quality of service (QoS) flow of a network (e.g., radio network 100). Generally, the QoS prediction module 214 can, based on a result of the analyzing the resource allocation, determine a threshold for QoS for user equipment (e.g., UE 230 or UE 232. Generally, the flow priority module 216 can determine a connection decision for a UE (e.g., UE 230 or UE 232) based on a comparison of a QoS prediction of a QoS level for the UE to the threshold.

One or more aspects of a component (e.g., the radio resource modeling module 212, QoS prediction module 214 and/or flow priority module 216) can be employed separately and/or in combination, such as employing one or more of the memory 204 or the processor 206. Additionally, and/or alternatively, the processor 206 can execute one or more program instructions to cause the processor 206 to perform one or more operations by these components. The bus 205 can enable local communication between the elements of the network admission control system 200 2.

Figure 3:
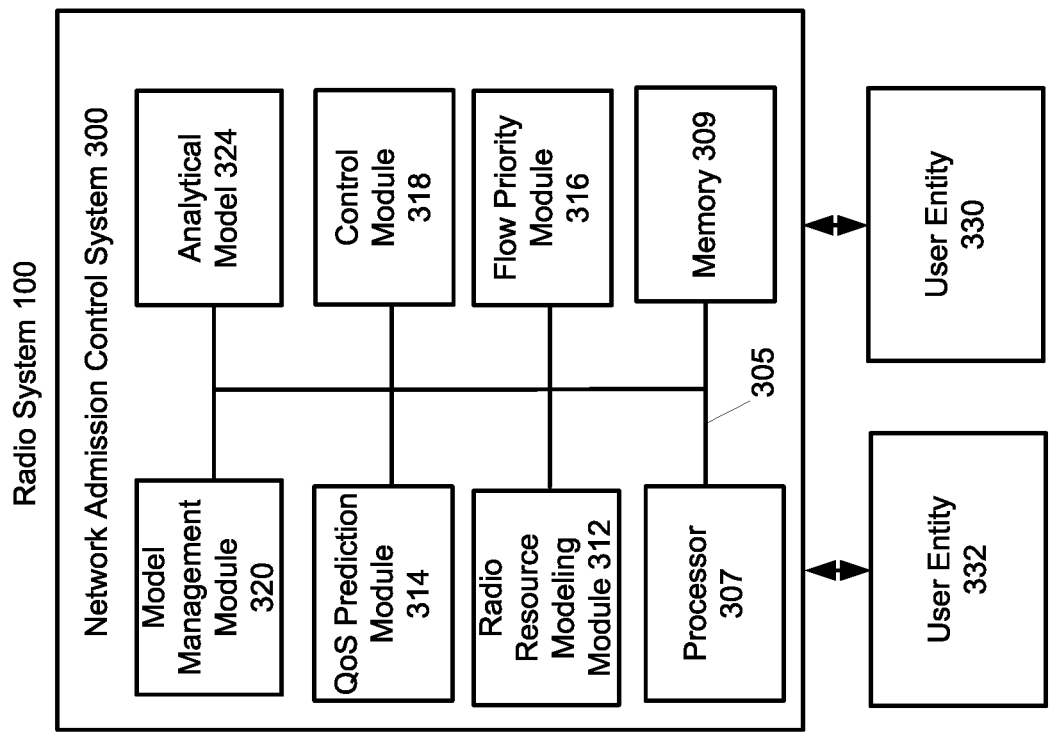
FIG. 3 illustrates another schematic representation of the radio system of FIG. 1, comprising a network admission control system, in accordance with one or more embodiments and/or implementations described herein.

Turning next to FIG. 3, an example of a radio system architecture is illustrated at 100, with description being provided below. The network admission control system 300 can be part of the radio system 100 (e.g., of FIG. 1) or can be at least partially external to the radio system 100. For purposes of brevity, additional aspects of the radio system 100 (e.g., as illustrated at FIG. 1) are not illustrated at FIG. 3. While referring here to one or more processes, operations, facilitations and/or uses of the non-limiting system architecture 300, description provided herein, both above and below, also can be relevant to one or more other non-limiting system architectures described herein.

Generally, the network admission control system 300 can comprise any suitable computing devices, hardware, software, operating systems, drivers, network interfaces and/or so forth. However, for purposes of brevity, only components generally relevant to admission control are illustrated in FIG. 3. For example, the network admission control system 300 can comprise a processor 306, memory 304, bus 305, radio resource modeling module 312, QoS prediction module 314, flow priority module 316, control module 318, model management module 320 and/or AI model 324.

Discussion first turns to the processor 306, memory 304 and bus 305 of the network admission control system 300.

In one or more embodiments, network admission control system 300 can comprise the processor 306 (e.g., computer processing unit, microprocessor, classical processor and/or like processor). In one or more embodiments, a component associated with network admission control system 300, as described herein with or without reference to the one or more figures of the one or more embodiments, can comprise one or more computer and/or machine readable, writable and/or executable components and/or instructions that can be executed by processor 306 to facilitate performance of one or more processes defined by such component(s) and/or instruction(s). In one or more embodiments, the processor 306 can comprise the radio resource modeling module 312, QoS prediction module 314, flow priority module 316, control module 318, model management module 320 and/or AI model 324.

The processor 306 can be configured to control one or more components/elements of the network admission control system 300, such as the radio resource modeling module 312, QoS prediction module 314, flow priority module 316, control module 318, model management module 320 and/or AI model 324.

In one or more embodiments, the network admission control system 300 can comprise the machine-readable memory 304 that can be operably connected to the processor 306. The memory 304 can store computer-executable instructions that, upon execution by the processor 306, can cause the processor 306 and/or one or more other components of the network admission control system 300 (e.g., radio resource modeling module 312, QoS prediction module 314, flow priority module 316, control module 318, model management module 320 and/or AI model 324) to perform one or more actions. In one or more embodiments, the memory 304 can store one or more computer-executable components.

Network admission control system 300 and/or a component thereof as described herein, can be communicatively, electrically, operatively, optically and/or otherwise coupled to one another via a bus 305 to perform functions of non-limiting system architecture 100, network admission control system 300 and/or one or more components thereof and/or coupled therewith. Bus 305 can comprise one or more of a memory bus, memory controller, peripheral bus, external bus, local bus and/or another type of bus that can employ one or more bus architectures. One or more of these examples of bus 305 can be employed to implement one or more embodiments described herein.

In one or more embodiments, network admission control system 300 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 306 and/or memory 304 described above, network admission control system 300 can comprise one or more computer and/or machine readable, writable and/or executable components and/or instructions that, when executed by processor 306, can facilitate performance of one or more operations defined by such component(s) and/or instruction(s).

Turning now to additional elements of the network admission control system 300, the radio resource modeling module 312 can analyze resource allocation for a quality of service flow. In one or more embodiments, this can comprise determining occurrence of an unintended degrading level of service for another UE (e.g., UE 332) other than the UE requesting access to the network (e.g., UE 330). In one or more embodiments, the radio resource modeling module 312 can predict bandwidth on a slice-level for cells of the network. This can be accomplished absent knowledge of slicing algorithms of vendor components of the network (e.g., without slice bandwidth prediction 620).

For example, to achieve this predicting, an analytical model 324 (also herein referred to as an artificial intelligence model) can be employed by the radio resource modeling module 312 to analyze the resource allocation of the network. A time-series model can be employed to forecast bandwidth for future time segments.

The analytical model 324 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 324 can comprise a deep neural network (DNN).

Generally, the analytical model 324 can be trained, such as by the model management module 320, on a set of training data that can represent the type of data for which the system will be used. That is, the analytical model 324 can be trained on historical radio resource allocations, bandwidths, levels of QoS and/or the like. The model management module 320 will be described further below in detail.

Figure 6:
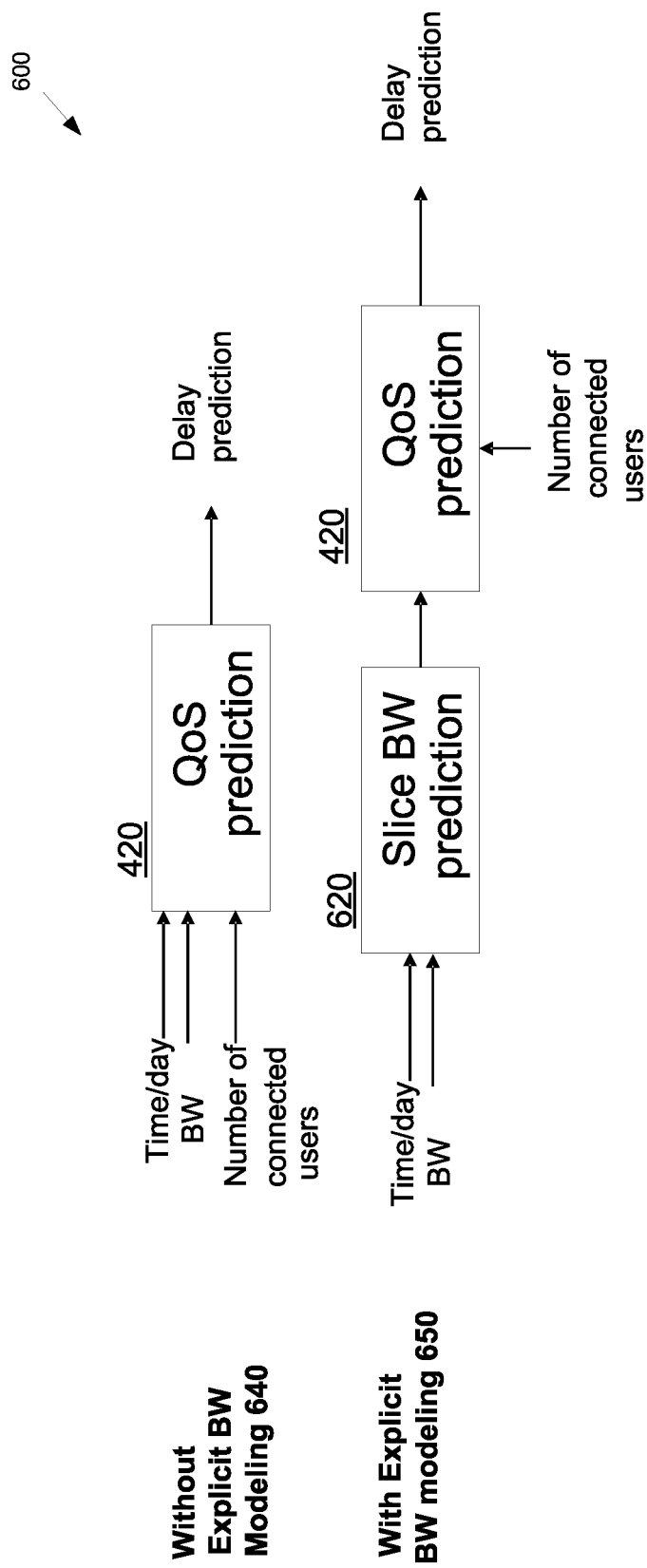
FIG. 6 illustrates a partial schematic diagram of a processes performed by a radio resource modeling module of the network admission control system of FIG. 3, in accordance with one or more embodiments and/or implementations described herein.

As illustrated at FIG. 6, modeling by the radio resource modeling module 312 can be performed with or without bandwidth modeling, with output of the bandwidth modeling being employed by the QoS prediction module 314. Bandwidth modeling can be related, such as directly, to resource modeling. At process 640 without explicit bandwidth modeling, one or more variables can be analyzed and determine to employ in generating the QoS prediction 420. These variables can comprise time/day, bandwidth, and/or number of connected users. As used herein, explicit bandwidth modeling can refer to where the QoS prediction module 314 learns/models resource patterns implicitly using provided input. Conversely, non-explicit bandwidth modeling can refer to using time, bandwidth and number of users as direct input to QoS prediction.

At process 650 with (explicit) bandwidth modeling, one or more variables can be analyzed and determine to employ in generating the QoS prediction 420. These variables can comprise time/day, bandwidth, and/or number of connected users. The number of connected users can be provided as input to the QoS prediction module 314. Since there is explicit bandwidth modeling in this process, the time and current bandwidth can be passed as input to the bandwidth prediction.

The variables can comprise current and historical data, and can be employed by the analytical model 324 to determine one or more allocation of resource predictions for the network. For example, addition of a user entity 330 to the network can degrade bandwidth available to the user entity 332, such as by adding too great a load to a cell of the network. In other example, addition of the user entity 330 can provide no detrimental effect to the user entity 332 or to the user entity 330.

Generally, the QoS prediction module 314 can predict delay at a UE level, to be compared against a QoS threshold for the admission decision of a UE. The output of the QoS prediction module 314 can be a QoS prediction, such as a delay prediction, for one or more, such as each, UE on a cell to be compared against the QoS thresholds.

The QoS prediction module 314 can, based on a result of the analyzing of the resource allocation, determine a threshold for number of UEs (e.g., UE 330 or 332) at the QoS flow. In one or more embodiments, the threshold can be determined absent information regarding function of a defined slicing process that determines allocation of resources of the network.

The QoS prediction module 314 can further, based on current network data and/or on historical learned data for the network, output the quality of service (QoS) prediction for the user equipment (e.g., UE 330) and one or more additional quality of service predictions for additional user equipment, other than the user equipment, already connected to the network (e.g., UE 332).

In one or more embodiments, the analytical model 324, or another analytical model, can be employed by the control module 318 and/or QoS prediction module 314 to determine the threshold and/or a QoS prediction. For example, the analytical model 324 can employ current network data and/or historical data for the network. In one or more embodiments, machine learning can be employed based on number of UE's, bandwidth, reference signal received power (RSRP), signal to interference & noise ratio (SINR), and delay data from simulations, such as offline simulations. As used herein, RSRP can represent measured power of a reference signal and used as an indicator of channel conditions.

In one or more embodiments, training of the analytical model 324 can comprise employing simulations designed with fixed resources (number of cells and fixed time) and varying number of UEs to measure how the KPIs change as the number of UEs increases. The analytical model 324 can be trained to predict the UEs' delay given the cell's channel conditions (RSRP and SINR) and the number of UEs connected to the cell. Real time data can be employed to re-train the model, such as if the model management module 320 determines the current analytical model's performance to be degrading.

Figure 7:
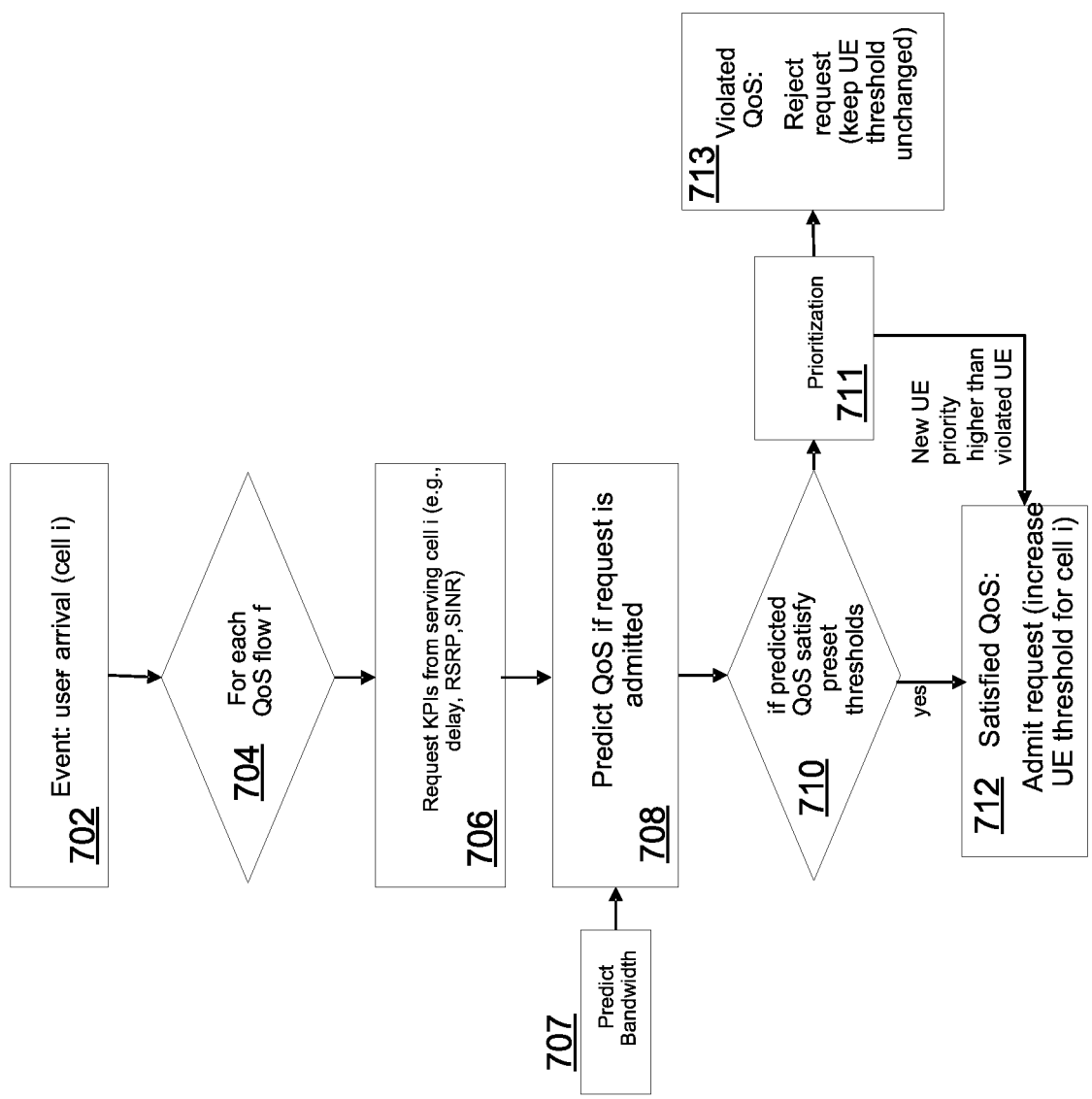
FIG. 7 illustrates a partial schematic diagram of processes performed by the network admission control system of FIG. 3, including processes performed by a quality of service prediction module of the network admission control system of FIG. 3, in accordance with one or more embodiments and/or implementations described herein.

Turning now to FIG. 7, a plurality of process are illustrated based on the QoS prediction processes defined above. At operation 702, a user entity can arrive at a cell and/or request access to the network at the cell. At operation 704, varying QoS flows f can be analyzed. At operation 706, KPIs can be requested from one or more serving cells (e.g., delay, RSRP, SINR). At operation 708, a QoS prediction can be made, such as by the QoS prediction module 314 and analytical model 324, employing the KPIs and also employed bandwidth predictions from operation 707, e.g., from the radio resource modeling module 312.

At operation 710, a decision can be made, such as by the flow priority module 316, whether the predicted QoS satisfies one or more thresholds. Satisfaction can comprise meeting and/or not exceeding the one or more thresholds. If satisfaction is met, at operation 712, an admit request can be generated, such as by the control module 318, such as which will increase UE threshold at a particular cell of the network.

If satisfaction is not met, one or more prioritization operations 711 can be performed, such as by the flow priority module 316, to determine whether the requesting UE 330 or any other already-connected UE (e.g., UE 332) has higher priority. Based on priorities, a lower priority requesting UE may not be admitted, a requesting UE may be admitted but at a degrades QoS, and/or an already-admitted UE may have a respective QoS partially degraded and/or receive a disconnection request/order.

In one example, if the new UE priority is higher than a violated UE, the new UE (e.g., requesting UE) can be admitted at operation 712. Alternatively, if the new UE violates a QoS, a rejected request can be generated at operation 713, such as where current UE threshold(s) for the cell remain unchanged.

Figure 8:
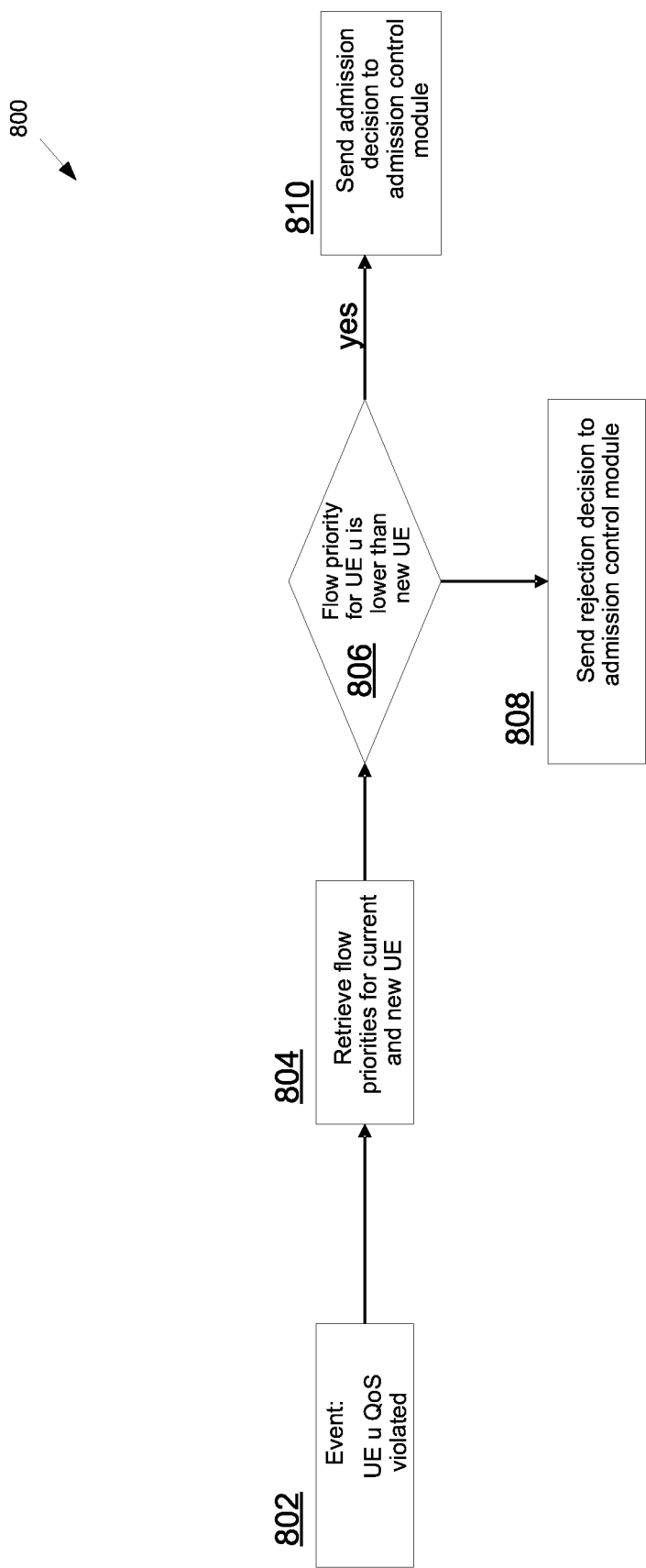
FIG. 8 illustrates a partial schematic diagram of a processes performed by a flow priority descriptor module of the network admission control system of FIG. 3, in accordance with one or more embodiments and/or implementations described herein.

Referring now in particular to the flow priority module 316 and FIG. 8, the flow priority module 316 can generally determine whether to admit or reject new UE requests based on effect of the UE predicted relative to QoS levels and/or degradation thereof. The flow priority module 316 can be triggered once a QoS threshold is violated by a QoS prediction (e.g., from the QoS prediction module 314), such as where one or more existing UEs on a cell is predicted to experience a QoS degradation upon admittance of the new UE.

The flow priority module 316 can determine a connection decision for a UE (e.g., 330) that is requesting admission to a network communicatively coupled to the system, based on a comparison of the QoS prediction of a QoS level for the UE (e.g., UE 330 or UE 332) to the threshold. That is as will be detailed, the decision can be based on a QoS prediction relative to the UE 330 requesting permission to the network and/or relative to the UE 332 that is already connected to or admitted to the network.

In one or more embodiments, the connection decision can be based on resource allocation, QoS prediction, priority of a UE, and/or any combination thereof.

In one or more embodiments, the connection decision of the QoS prediction module 314 can be at least partially based on a determination of priority of the user equipment 330 as compared to one or more priorities of one or more additional user equipment (e.g., UE 332), other than the user equipment, already connected to a network.

As illustrated at FIG. 8, determining the connection decision can be based on a plurality of additional processes. These processes can include an operation 802 where a UE requesting entry violates a QoS, and operation 804 to retrieve flow priorities for current and new UEs, operation 806 where a flow priority decision is made that a current UE (UE u) is lower than the new UE. As such, at operation 808, a rejection decision can be issued, generated, sent and/or otherwise obtained by the control module 318 from the flow priority module 316. Alternatively, if a QoS is not violated, at operation 810, a decision to admit can be issued, generated, sent and/or otherwise obtained by the control module 318 from the flow priority module 316.

Figure 9:
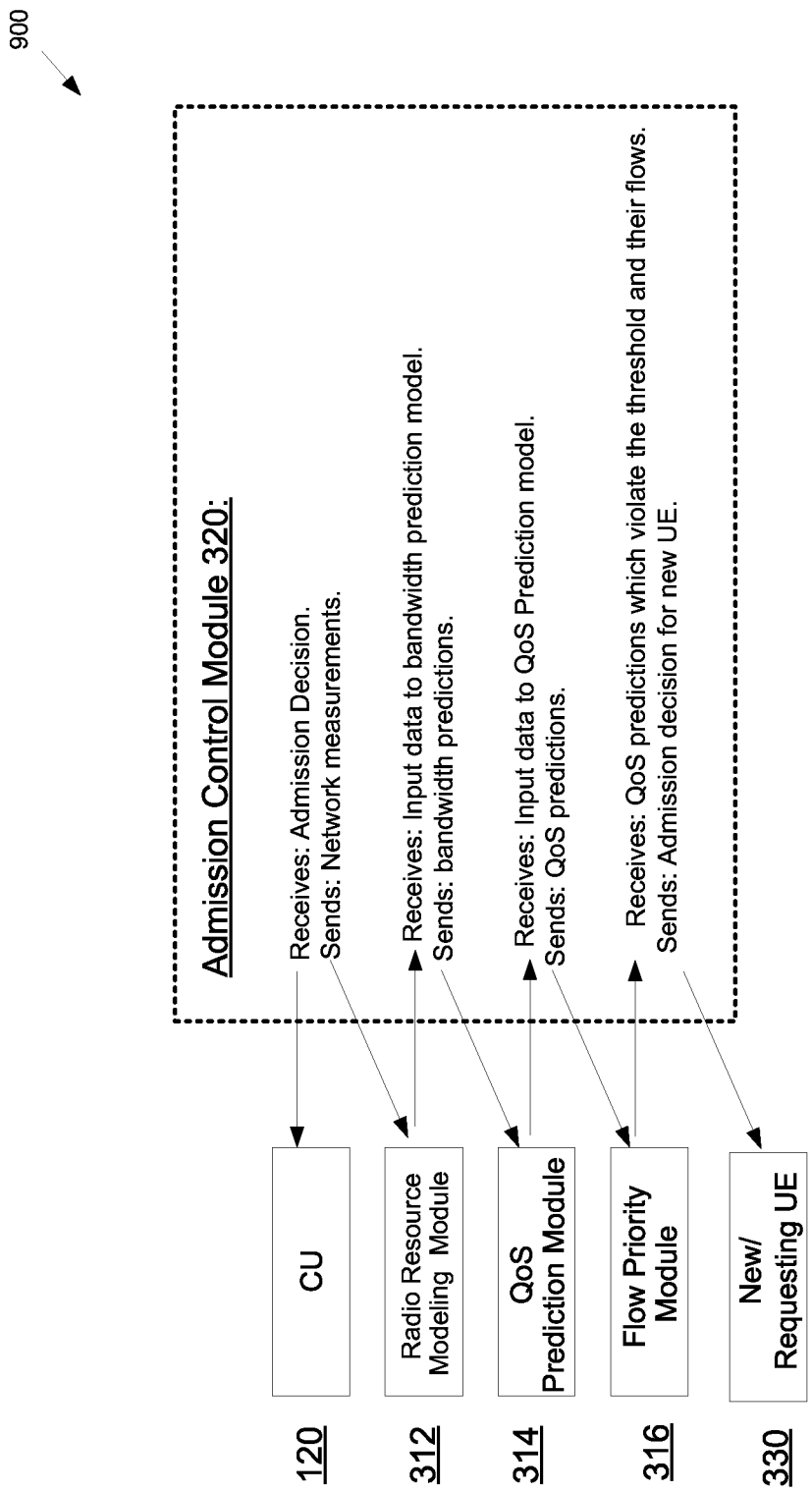
FIG. 9 illustrates a partial schematic diagram of a processes performed by an admission control module of the network admission control system of FIG. 3, in accordance with one or more embodiments and/or implementations described herein.

Turning now to the control module 318 and FIG. 9, the control module 318 can generally act as a central module manager.

The control module 318 (or the processor 306 or any other suitable component) can first receive the request from the UE 330 for admittance to the network. The control module 318 can admit the UE 330 to the network based on a higher priority of the user equipment 330 as compared to at least one priority of at least one of the additional user equipment (e.g., UE 332) already connected to the network. Additionally or alternatively, the control module 318 can enable degradation of at least one quality of service of at least one of the additional user equipment (e.g., UE 332) already connected to the network, based on at least one lower priority of the at least one of the additional user equipment as compared to a priority of the user equipment 330. Alternatively, the control module 318 can reject the admission request of the user equipment 330, such as where the UE 332 has a higher priority, and/or where degradation of a QoS level of the UE 332 or of another already-connected UE would cross or meet one or more QoS limits, for example.

In one or more embodiments, the control module 318 can trigger the determination of priority based on a predicted violation of the threshold by the user entity or by another user entity already connected via the network, prediction can be generated and output by the QoS prediction module 314.

In one or more embodiments, the control module 318 can allocate and/or direct allocation of resources of the network. The allocating can comprise determining the resource allocation for the QoS flow based on a defined slicing process.

Particularly looking to FIG. 9, the control module 318 can perform one or more actions relative to one or more actions performed by and/or outputs obtained from one or more other components, such as the radio resource modeling module 312, the QoS prediction module 314, the flow priority module 316, and/or the model management module 322.

For example, from to the central unit (CU) 120, the control module 318 can receive/obtain network measurements to send to the radio resource modeling module 312. From to the radio resource modeling module 312, the control module 318 can receive/obtain input data regarding bandwidth and send the bandwidth predictions to the QoS prediction module 314.

From to the QoS prediction module 314, the control module 3218 can receive/obtain QoS prediction inputs and can send QoS predictions to the flow priority module 316. This can be based on a comparison of the QoS predictions to the thresholds by the control module 318. A violation can cause the control module 318 to trigger or generate a trigger of the flow priority module 316. From the flow priority module 316, the control module 318 can receive QoS predictions that violate one or more thresholds and/or QoS flows, and can send a rejection or admittance admission decision for the new UE to the new UE 330 and/or to a RAN node, such as the CU 120.

Figure 10:
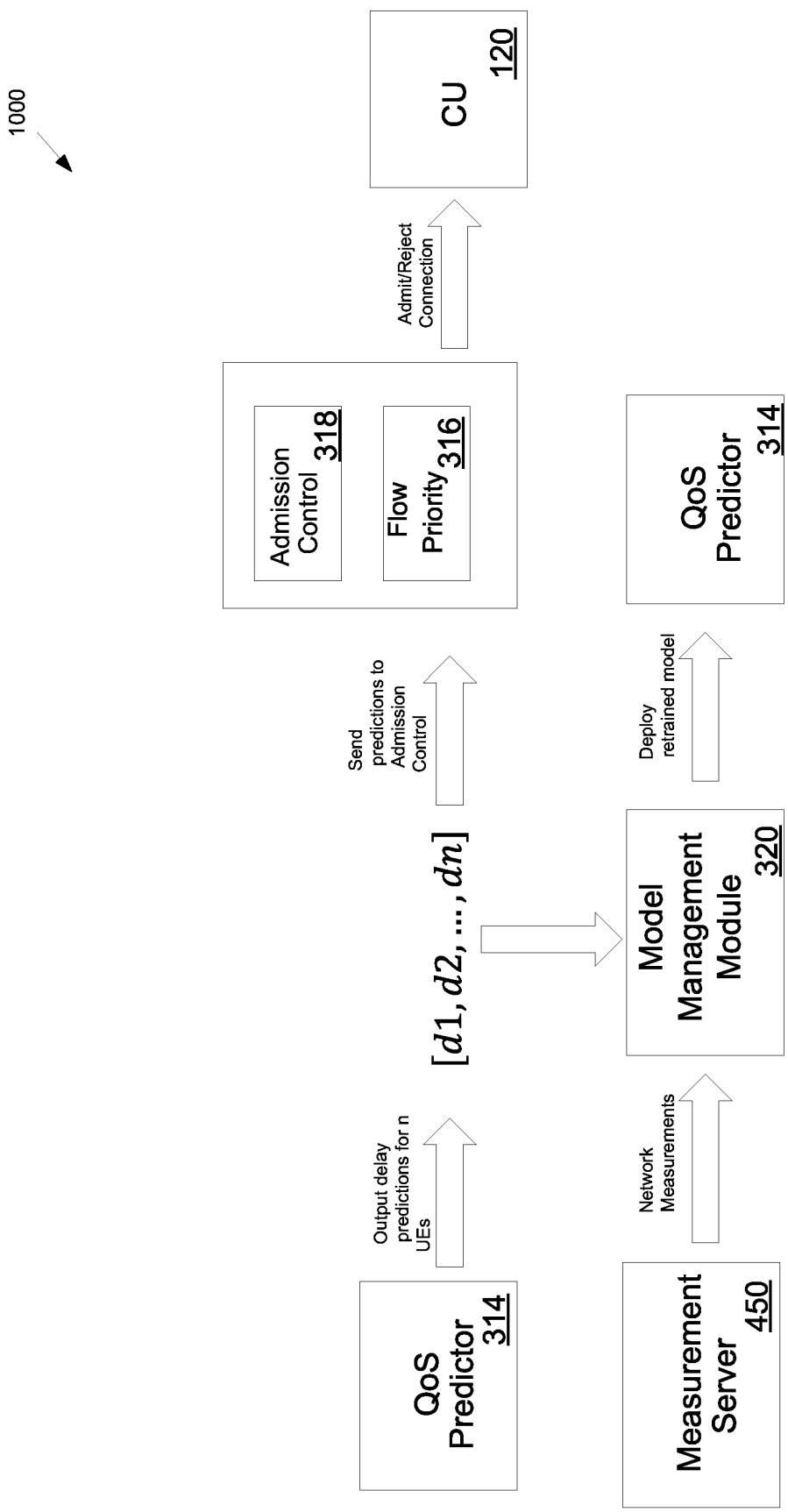
FIG. 10 illustrates a partial schematic diagram of a processes performed by an AI model manager module of the network admission control system of FIG. 3, in accordance with one or more embodiments and/or implementations described herein.

Turning now to the model management module 320 and FIG. 10, the model management module 320 can generally keep QoS predictions reliable.

Checks of the analytical model 324, such as relative to QoS prediction, can be performed periodically and/or at any other frequency for deterioration. Re-training of the analytical model 324 can be performed employing up-to-date data collected from network measurements over a specified time window. For example, the model management module 320 can train the AI/analytical model 324 upon determination of provision of an unpredicted degradation of one or more level of quality of services being provided to one or more user equipment already connected to a network communicatively coupled to or comprising the system.

One or more processes performed by the model management module 320 that can lead to training can comprise: receiving and saving QoS predictions for a next time slot, collecting network measurements received from the CU in the following time slot, using reported data to evaluate QoS predictions retrieved earlier, and/or if performance scoring is below a threshold, trigger retraining.

For example, FIG. 10 describes the flow of processes relative to the model management module 320. The model management module 320 can receive the records the predictions made by the QoS prediction module 314, and can compare them to the actual reported network data, to test the analytical model 324 performance on live data. When the analytical model 324 performance is degraded, such as beyond a target performance, the model management module 320 can be responsible for retraining the analytical model 324, such as using data collected from network measurements, and deploying the retrained analytical model 324.

Figure 4:
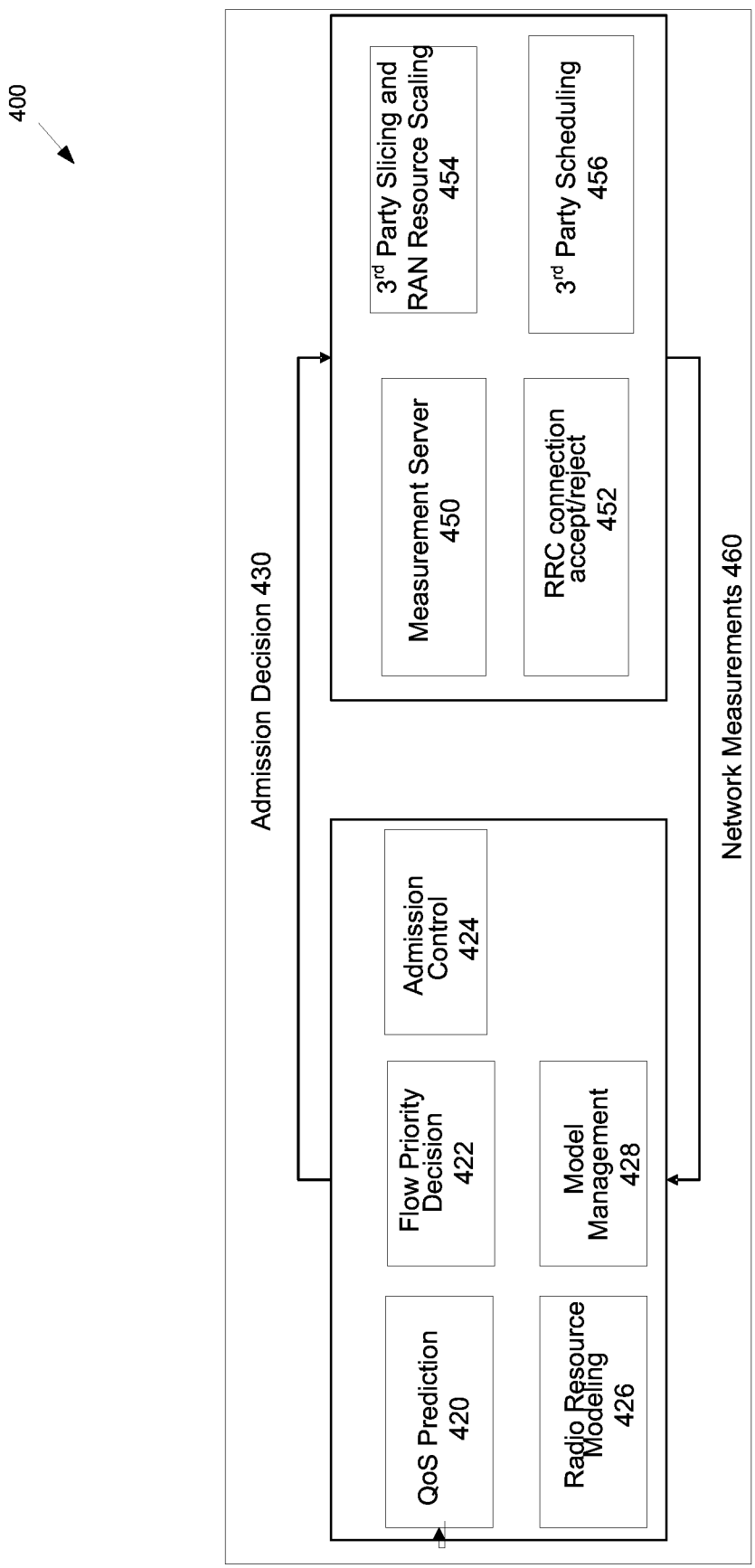
FIG. 4 illustrates a partial schematic diagram of the network admission control system of FIG. 3, in accordance with one or more embodiments and/or implementations described herein.
Figure 5:
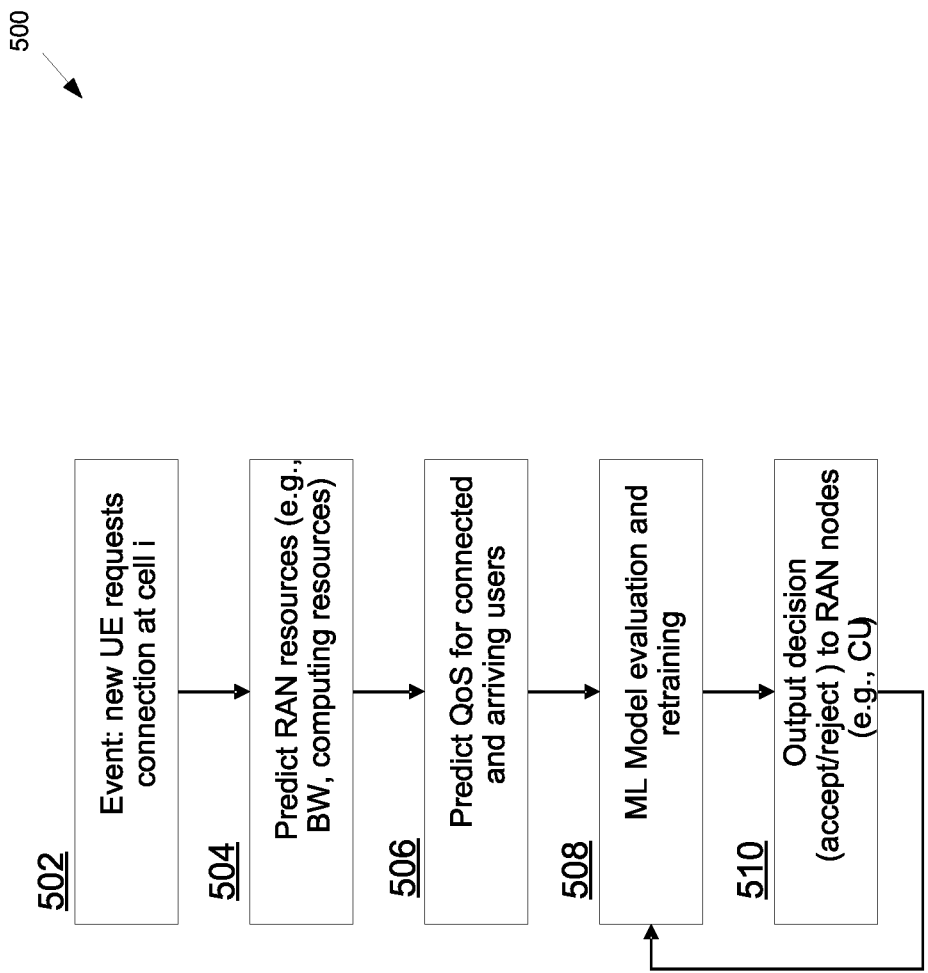
FIG. 5 illustrates a partial schematic diagram of general processes performed by the network admission control system of FIG. 3, in accordance with one or more embodiments and/or implementations described herein.

In summary, turning to FIGS. 4 and 5, a plurality of process can be employed in combination with one another to allow for the admission decision 430. These process can include the QoS prediction 420, the flow priority decision 422, the admission control 424 of the modules, the radio resource modeling 426 and the model management 428. Put another way, these processes can generally comprise, at a low detail level, an operation 502 to receive a request for connection, an operation 504 to predict RAN resources (e.g., the radio resource modeling 426 by the radio resource modeling module 312), an operation 506 to predict QoS for connected and arriving UEs (e.g., QoS prediction 420 by the QoS prediction module 314), operation 508 to evaluate and retrain AI models employed (e.g., the model management 428 by the model management module 322), and operation 510 to output a decision to RAN nodes for accepting or rejecting the admission/connection request (e.g., the admission control 424 by the control module 318, particularly in response to the flow priority decision 422 by the flow priority module 316). These processes themselves can output results based on one or more inputs from one or more other ones of the modules and/or from the measurement server 450, $3^{rd}$ party scheduling 456, and/or $3^{rd}$ party slicing and RAN resource scaling 454. As a result, an RRC connection accept/rejection 452 can be executed.

Turning now to FIGS. 11 and 12, a process flow comprising a set of operations is illustrated relative to FIG. 2 for admitting a user entity to a network and/or for addressing an admission decision relative to a user entity already admitted to the network. One or more elements, objects and/or components referenced in the process flow 1100 can be those of system 100 and/or system 200. Repetitive description of like elements and/or processes employed in respective embodiments is omitted for sake of brevity.

At operation 1102, the process flow 1100 can comprise analyzing, by a system comprising a processor (e.g., radio resource modeling module 312), resource allocation for a quality of service (QoS) flow.

At operation 1103, the process flow 1100 can comprise wherein the analyzing the resource allocation comprises analyzing, by the system (e.g., radio resource modeling module 312), network output to facilitate determining occurrence of one or more unanticipated degrading levels of QoS.

At operation 1104, the process flow 1100 can comprise determining, by the system (e.g., QoS prediction module 314), and based on a result of the analyzing the resource allocation, a threshold for QoS for user equipment (UE) at the QoS.

At operation 1106, the process flow 1100 can comprise outputting, by the system (e.g., QoS prediction module 314), based on current data and historical learned data for a network communicatively coupled to or comprising the system, the QoS prediction for the UE and one or more additional QoS predictions for additional UE, other than the UE, already connected to the network.

At operation 1108, the process flow 1100 can comprise determining, by the system (e.g., flow priority module 316), a connection decision for a UE based on a comparison of a QoS prediction of a QoS level for the UE to the threshold.

At operation 1110, the process flow 1100 can comprise determining, by the system (e.g., flow priority module 316), the connection decision at least partially based on a determination of priority of the UE as compared to one or more priorities of one or more additional UE, other than the UE, already connected to a network communicatively coupled to or comprising the system.

At operation 1212, the process flow 1100 can comprise triggering, by the system (e.g., control module 318), the determination of priority based on a predicted violation of the threshold by the UE or by another UE already connected via the network.

At operation 1214, the process flow 1100 can comprise admitting, by the system (e.g., control module 318), the UE to the network based on a higher priority of the UE as compared to at least one priority of at least one of the additional UE already connected to the network.

Alternatively or additionally to operation 1214, at operation 1216, the process flow 1100 can comprise enabling degradation, by the system (e.g., control module 318), of at least one QoS of at least one of the additional UE already connected to the network, based on at least one lower priority of that at least one of the additional UE as compared to a priority of the UE.

At operation 1218, the process flow 1100 can comprise allocating, by the system (e.g., control module 328), resources of a network communicatively coupled to or comprising the system, the allocating comprising determining the resource allocation for the QoS flow based on a defined slicing process.

At operation 1220, the process flow 1100 can comprise employing, by the system (e.g., QoS prediction module 314, radio resource modeling module 312 and/or control module 318), or more artificial intelligence models to predict the QoS level, to determine the threshold, and/or to conduct the resource allocation analysis.

At operation 1222, the process flow 1100 can comprise training, by the system (e.g., model management module 320), the one or more artificial intelligence models upon determination of an occurrence of an unintended degrading level of service for the user equipment or for the another user equipment.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 1100 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can employ dynamically changing network variables and/or user entity priorities to determine admission of one or more user entities to the network. In an embodiment, a system can comprise a processor, and a memory that stores executable instructions that, when executed by the processor, facilitate performance of operations. The operations can comprise analyzing resource allocation for a quality of service flow. The operations further can comprise, based on a result of the analyzing the resource allocation, determining a threshold for quality of service for user equipment at the quality of service flow, and determining a connection decision for a user equipment based on a comparison of a quality of service prediction of a quality of service level for the user equipment to the threshold.

As a result, the one or more embodiments of the aforementioned system, method and/or non-transitory machine-readable medium can allow for dynamic control of admission control such as when a network comprises multi-vendors and/or components of multi-vendors. Another advantage of these one or more processes can be a learned and dynamic approach to admission control, absent use of static and fixed thresholds, thus accounting for dynamic conditions of a network and/or dynamic changes to user entity permissions, priorities and/or the like. Another advantage of these one or more processes can be dynamic control that is adapted to different permissions, priorities and/or the like of different user entities.

A practical application of the systems, computer-implemented methods and/or non-transitory computer-readable mediums described herein can be efficient and intuitive admission control to a network of a radio system. Overall, such computerized tools can constitute a concrete and tangible technical improvement in the field of admission control and/or admission control forecasting of a radio system/radio network, without being limited thereto.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide dynamic and adaptable network admission control, as compared to existing systems and/or techniques. Systems, computer-implemented methods and/or computer program products facilitating performance of these processes are of great utility in the fields of radio network and radio system admission controls and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze network conditions and user entities, predict admissions decision results, and/or determine a dynamically-controlled admission decision in the time that one or more embodiments described herein can facilitate these processes. And, neither can the human mind nor a human with pen and paper electronically perform one or more of these processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 13:
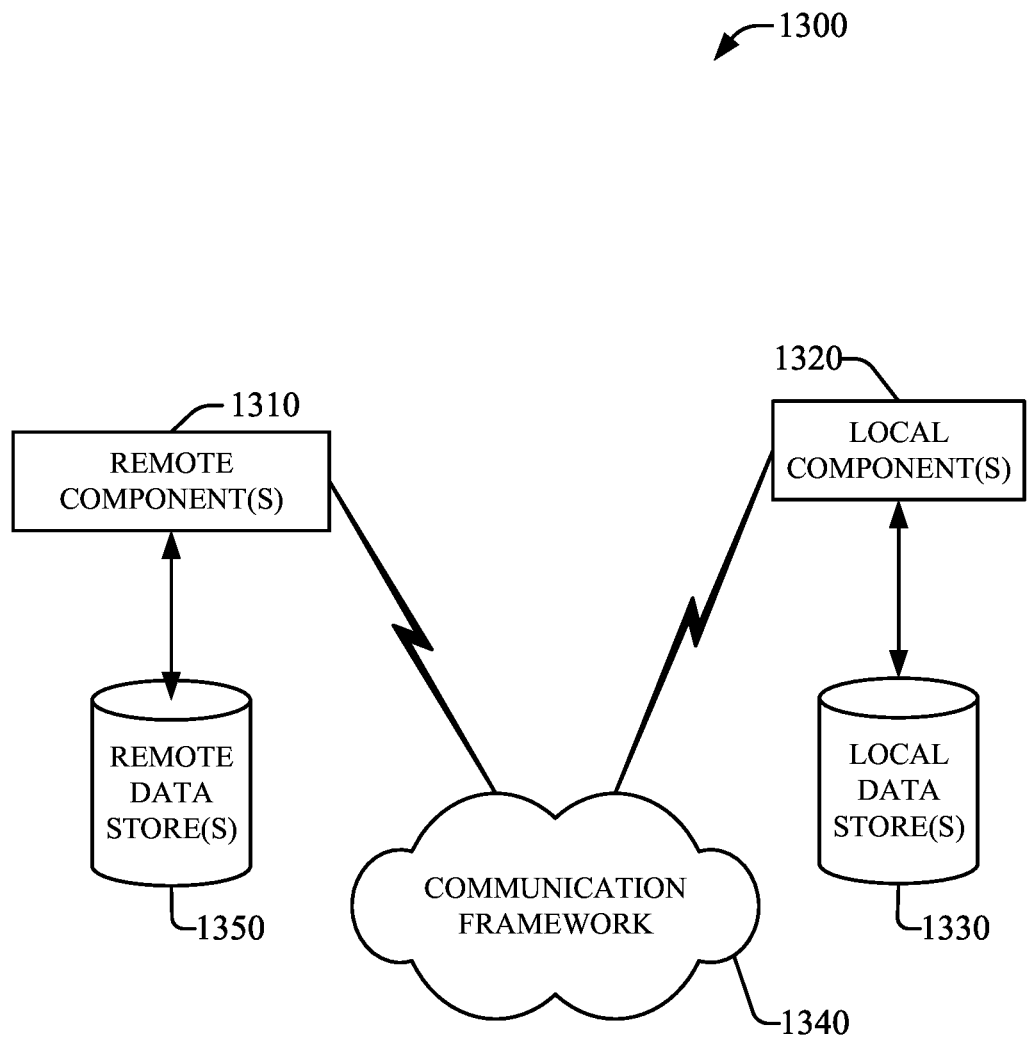
FIG. 13 illustrates a block diagram of an example operating environment into which embodiments of the subject matter described herein can be incorporated.

FIG. 13 is a schematic block diagram of an operating environment 1300 with which the described subject matter can interact. The operating environment 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The operating environment 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The operating environment 1300 comprises a communication framework 1340 that can be employed to facilitate communications between the remote component(s) 1310 and the local component(s) 1320, and can comprise an air interface, e.g., interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Example Computing Environment

Figure 14:
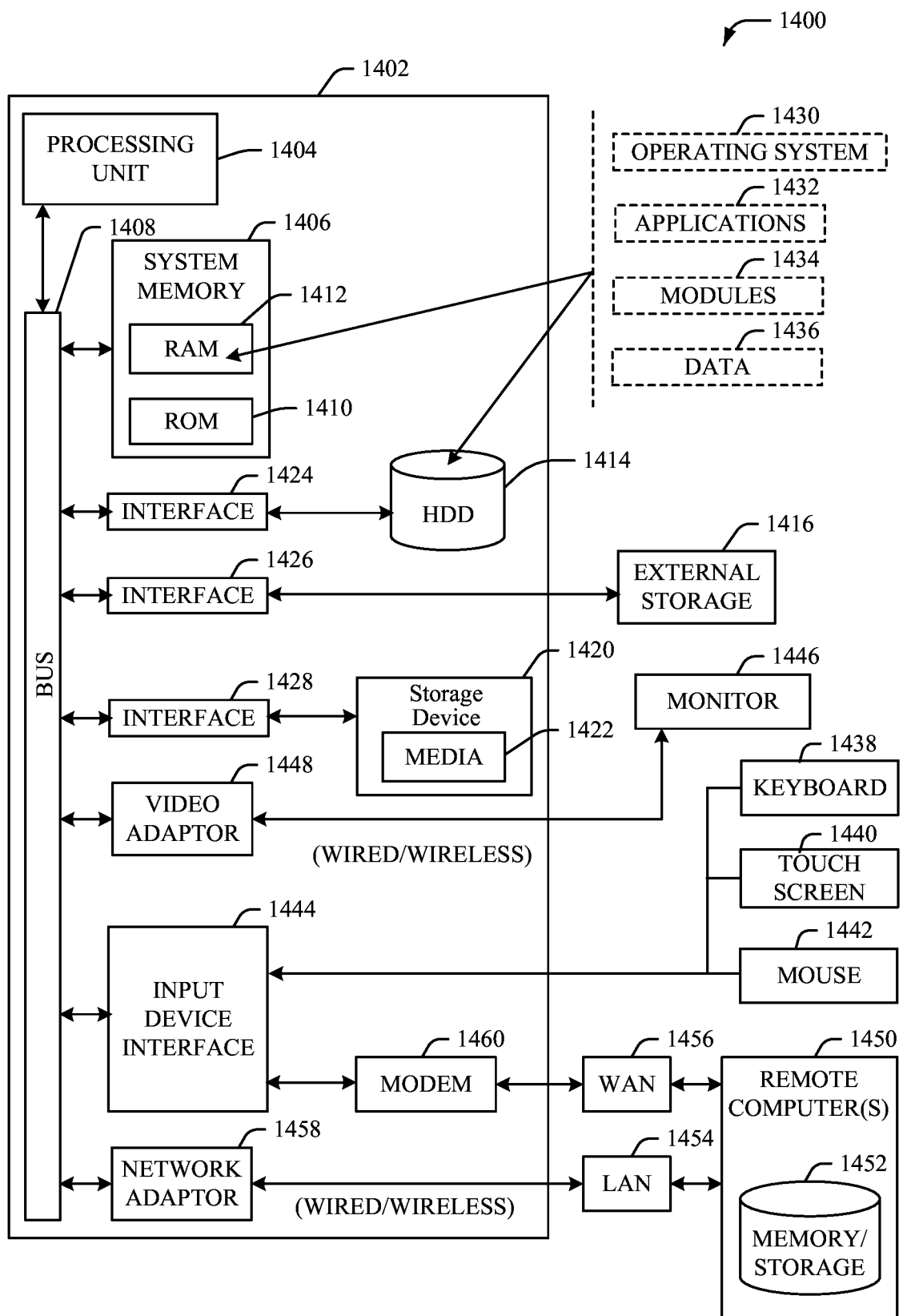
FIG. 14 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 14, the example computing environment 1400 which can implement one or more embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in the computing environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. The network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   at least one processor; and
   at least one memory that stores executable instructions that, when executed by the at least one processor, facilitate performance of operations, comprising:
   analyzing a resource allocation for a quality of service flow of a network;
   based on a result of the analyzing of the resource allocation, determining a threshold for quality of service for a user equipment at the quality of service flow;
   selecting a connection decision for the user equipment to the network based on a comparison of a quality of service prediction of a quality of service level for the user equipment to the threshold and based on an additional comparison of an additional quality of service prediction for an additional quality of service level for an additional user equipment to the threshold, wherein the additional user equipment is already connected to the network;
   determining that admitting the user equipment to the network is associated with a degraded quality of service level for the user equipment or with a degradation of the additional quality of service level;
   based on respective priority levels for the user equipment and the additional user equipment, determining acceptability of the degraded quality of service level or the degradation; and
   based on the acceptability, admitting the user equipment to the network, thereby allowing the degraded quality of service level for the user equipment or allowing the degradation of the additional quality of service level.

2. The system of claim 1, wherein the network is communicatively coupled to or comprises the system.

3. The system of claim 1, wherein the operations executed by the at least one processor further comprise:
   based on current system data and historical learned data for the network, outputting the quality of service prediction for the user equipment and the additional quality of service prediction for the additional user equipment already connected to the network.

4. The system of claim 1, wherein the operations executed by the at least one processor further comprise:
   selecting the connection decision at least partially based on a determination of a higher priority of the user equipment as compared to a lower priority of the additional user equipment or vice versa.

5. The system of claim 1, wherein the operations executed by the at least one processor further comprise:
   training an artificial intelligence model, employed for the determining of the threshold or for the determining of the quality of service prediction, upon determination of provision of an unpredicted degradation of one or more level of quality of services being provided to one or more user equipment already connected to a network, other than the user equipment and the additional user equipment.

6. The system of claim 1, wherein the operations executed by the at least one processor further comprise:
   allocating resources of the network, the allocating comprising determining the resource allocation for the quality of service flow based on a defined slicing process.

7. The system of claim 1, wherein the determining that admitting the user equipment to the network is associated with the degraded quality of service level or with the degradation of the additional quality of service level is performed regardless of a time of day at which admission is requested to be initiated.

8. The system of claim 1, wherein the operations executed by the at least one processor further comprise:
   performing the analyzing of the resource allocation at a specified frequency and thereby determining the threshold at the specified frequency based on the analyzing of the resource allocation at the specified frequency.

9. A non-transitory machine-readable medium, comprising executable instructions that, when executed by at least one processor facilitate performance of operations, comprising:
   obtaining a request for admittance by a first user equipment to a network;
   determining a threshold for quality of service for second user equipment connected to or to be connected to the network, based on learned network parameters;
   identifying, based on the threshold, a predicted degradation of a quality of service level for the second user equipment, as compared to the threshold; and
   generating a decision for response to the request based on the threshold and based on a higher priority level for the first user equipment as compared to a lower priority level for the second user equipment, wherein the decision comprises accepting the request for admittance by the first user equipment to the network in connection with accepting occurrence of the predicted degradation of the quality of service level for the second user equipment.

10. The non-transitory machine-readable medium of claim 9, wherein the determining the threshold is executed absent information regarding function of a defined slicing process that determines allocation of resources of the network.

11. The non-transitory machine-readable medium of claim 9, wherein the operations executed by the at least one processor further comprise:

at least partially basing the decision for the response to the request based on a first defined priority of the first user equipment as compared to a second defined priority of one of the second user equipment already connected via the network.

12. The non-transitory machine-readable medium of claim 9, wherein the operations executed by the at least one processor further comprise:
training an artificial intelligence model employed for the determining of the threshold based on a determination of one or more unanticipated degrading levels of quality of service to one or more of the second user equipment already connected to the network.

13. The non-transitory machine-readable medium of claim 12, wherein the operations executed by the at least one processor further comprise:
employing another artificial intelligence model, other than the artificial intelligence model, to analyze network output and to facilitate determining occurrence of the one or more unanticipated degrading levels of quality of service.

14. The non-transitory machine-readable medium of claim 9, wherein the accepting the request for admittance by the first user equipment to the network in connection with accepting occurrence of the predicted degradation of the quality of service level for the second user equipment is performed regardless of a time of day at which admittance is requested to be initiated.

15. A method, comprising:
predicting, by a system comprising at least one processor, a quality of service level for a user equipment requesting admission to a network, resulting in a predicted quality of service level and an additional quality of service level for an additional user equipment already admitted to the network, resulting in a predicted additional quality of service level;
determining, by the system, a threshold based on a current prediction for resource allocation of the network, wherein the predicted quality of service level is degraded as compared to the threshold, and wherein the predicted additional quality of service level is degraded as compared to the threshold; and
generating a decision, using an analytical model communicatively coupled to or comprised by the system, to admit the user equipment to the network and to disconnect the additional user equipment from the network, based at least partially on the predicted quality of service level and on the predicted additional quality of service level,
wherein the decision is based at least on a higher priority level for the user equipment as compared to a lower priority level for the additional user equipment.

16. The method of claim 15, further comprising:
employing, by the system, the analytical model or one or more additional analytical models to predict the quality of service level and to determine the threshold, based on present and historical network data from present and historical connections by other user equipment other than the user equipment and other than the additional user equipment.

17. The method of claim 15, further comprising:
determining, by the system, occurrence of an unintended degrading level of service for another user equipment already connected to the network, other than the user equipment, and other than the additional user equipment; and
training, by the system, the analytical model upon the determination of the occurrence.

18. The method of claim 15, wherein the predicting, of the quality of service level for the user equipment and the additional quality of service level for the additional user equipment comprises predicting the quality of service level for the user equipment and the additional quality of service level for the additional user equipment based on current and historical learned data for current and historical user equipment traffic via the network.

19. The method of claim 15, further comprising:
re-training or further training, by the system, the analytical model based on the system having identified an unpredicted degradation of the quality of service level as compared to the predicted quality of service level.

20. The method of claim 15, further comprising:
re-determining, by the system, at a specified frequency, the threshold based on resource allocation for the network.

* * * * *